US008626746B2

(12) United States Patent
Krishnamoorthy (10) Patent No.: US 8,626,746 B2
(45) Date of Patent: *Jan. 7, 2014

(54) TRACKING MODIFICATIONS TO VALUES OF VARIOUS FIELDS IN A DATABASE SERVE

(75) Inventor: Karthick Krishnamoorthy, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,560

(22) Filed: Jun. 19, 2012

(65) Prior Publication Data

US 2012/0317147 A1 Dec. 13, 2012

Related U.S. Application Data

(63) Continuation of application No. 11/164,923, filed on Dec. 12, 2005, now Pat. No. 8,224,808.

(51) Int. Cl.
*G06F 7/00* (2006.01)
*G06F 17/30* (2006.01)

(52) U.S. Cl.
USPC .......................... 707/715; 707/804; 707/792

(58) Field of Classification Search
None
See application file for complete search history.

(56) References Cited

U.S. PATENT DOCUMENTS

| | | | |
|---|---|---|---|
| 4,956,774 A | 9/1990 | Shibamiya et al. | |
| 7,720,804 B2 * | 5/2010 | Fazal et al. | 707/601 |
| 2003/0135480 A1 | 7/2003 | Van Arsdale et al. | |
| 2003/0154197 A1 | 8/2003 | Millet et al. | |
| 2003/0225798 A1 | 12/2003 | Norcott | |
| 2004/0225865 A1 * | 11/2004 | Cox et al. | 712/34 |
| 2005/0065965 A1 | 3/2005 | Ziemann et al. | |
| 2005/0091291 A1 | 4/2005 | Kaler et al. | |
| 2005/0216503 A1 | 9/2005 | Charlot et al. | |
| 2006/0047715 A1 * | 3/2006 | Parizeau | 707/203 |
| 2006/0122964 A1 | 6/2006 | Yu et al. | |
| 2006/0123010 A1 | 6/2006 | Landry et al. | |
| 2006/0143243 A1 * | 6/2006 | Polo-Malouvier et al. | 707/203 |
| 2006/0173879 A1 | 8/2006 | MacFarlane et al. | |
| 2007/0162500 A1 | 7/2007 | Herwadkar | |
| 2007/0282808 A1 | 12/2007 | Hashirano et al. | |

* cited by examiner

*Primary Examiner* — Cheryl Lewis
*Assistant Examiner* — Raheem Hoffler
(74) *Attorney, Agent, or Firm* — Narendra Reddy Thappeta (57) ABSTRACT

Storing historical/previous values of a field of a relational database in the same table. The previous values can be conveniently used to revert back to any of such previously stored values. Thus, for each update/modify operation, the present value is stored as a previous value. In one embodiment, the previous values are stored in a VARRAY associated with each field. The indexed entries of the VARRAY store the present as well as previous values of the field.

21 Claims, 9 Drawing Sheets

| Identifier - 410 | Price - 420 | Name - 430 |
|---|---|---|
| Item1 | 1000.00 | CPU |
| Item2 | 550.00 | Monitor |
| Item3 | 110.00 | KeyBoard |

| Count 490 | Identifier - 460 | | | | Price - 470 | | | | | Name - 480 | | | |
|---|---|---|---|---|---|---|---|---|---|---|---|---|---|
| 3 | Item1 | Item1 | Item1 | Item1 | 950.00 | 920.00 | 900.00 | 1000.00 | | CPU | CPU | CPU | CPU |
| 2 | Item2 | Item2 | Item2 | | 600.00 | 800.00 | 550.00 | | | Monitor | Monitor | Monitor | |
| 2 | Item3 | Item3 | Item3 | | 180.00 | 90.00 | 110.00 | | | KeyBoard | KeyBoard | KeyBoard | |

601 → Create table product
602 → (
603 → Identifier varchar2 (16),
604 → Price Float,
605 → Name Varchar2 (10)
606 → ) enable journal;

*FIG. 6A*

611 → CREATE TYPE v_identifier AS VARRAY(50) OF
612 → VARCHAR2(16);
613 → CREATE TYPE v_price AS VARRAY(50) OF FLOAT;
       CREATE TYPE v_name AS VARRAY(50) OF VARCHAR2(10);
614 →
615 → CREATE TABLE product (
616 →   Identifier v_identifier,
617 →   Price v_price,
618 →   Name v_name
       );

*FIG. 6B*

701: Begin
702: Insert into product values ('Item 1',1000.00,'CPU');
703: End;

FIG. 7A

710: Begin
711: Insert into product values(v_identifier('Item 1'),v_price(1000.00),v_name('CPU'));
712: End;

FIG. 7B

801 → UPDATE product set price = price_in
802 → Where identifier = 'Item 3'

FIG. 8A

```
       create procedure wrapper_product(identifier_in
811→   product.identifier%type,price_in product.price%type,name_in
       product.name%type) as
       declare
812→      old_identifier v_identifier;
813→      old_price v_price;
814→      old_name v_name;
815→
816→      new_identifier v_identifier;
817→      new_price v_price;
818→      new_name v_name;

820→   begin
821→      select identifier into old_identifier from product where identifier= 'Item3';
822→      select price into old_price from product where identifier= 'Item3';
823→      select name into old_name from product where identifier= 'Item3';
824→      new_identifier(1) := identifier_in;
825→      new_price(1) := price_in;
826→      new_name(1) := name_in;

827→      FOR i IN old_identifier.FIRST .. old_identifier.LAST
828→      Loop
829→         new_identifier(i+1) = old_identifier(i);
830→         new_identifier(i+1) = old_identifier(i);
831→         new_identifier(i+1) = old_identifier(i);
832→      End loop
833→      Update product set identifier=new_identitifer,price = new_price,
         name=new_name where identifier = 'Item3'
834→      Update product set count= i where identifier = 'Item 3'
835→   end;
```

TRACKING MODIFICATIONS TO VALUES OF VARIOUS FIELDS IN A DATABASE SERVE

RELATED APPLICATIONS

The present application is a continuation application of co-pending US patent application entitled, "Tracking Modifications to Values of Various Fields in a Database Server", application Ser. No. 11/164,923, Filed: Dec. 12, 2005, and is incorporated in its entirety herewith.

BACKGROUND OF THE INVENTION

1. Field of the Invention

The present invention relates to database technologies, and more specifically to a method and apparatus for tracking modifications to values of various fields in a database server.

2. Related Art

A database server generally refers to a system which permits organization of related data and management of the organized data using structured queries. For example, in case of relational databases, SQL queries facilitate definition of schemas for tables contained in each database instance, and then to add, delete or change the data in various rows of the tables. The description is continued with respect to relational databases for illustration.

In general, the data of interest may be viewed as containing various values which are stored in fields organized in a database instance. The intersection of a column and row specifies the corresponding field in case of relational database. As may be appreciated, the values of fields can change, typically in response to queries which set the field to a new value.

There is often a need to track the modification (change) of values of several fields of interest. For example, the tracked values serve as an audit record for the corresponding field.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, the sequence of values a field of interest are set to, are stored/tracked in the same table associated with the field of interest. Due to such tracking, the prior values for any field may be quickly available for any later use (e.g., to revert back to a prior value).

According to one more aspect of the present invention, the user merely needs to specify the fields of interest and the database server automatically (i.e., without requiring further instructions from users) tracks the prior values.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

2. Example Environment

Figure 1:
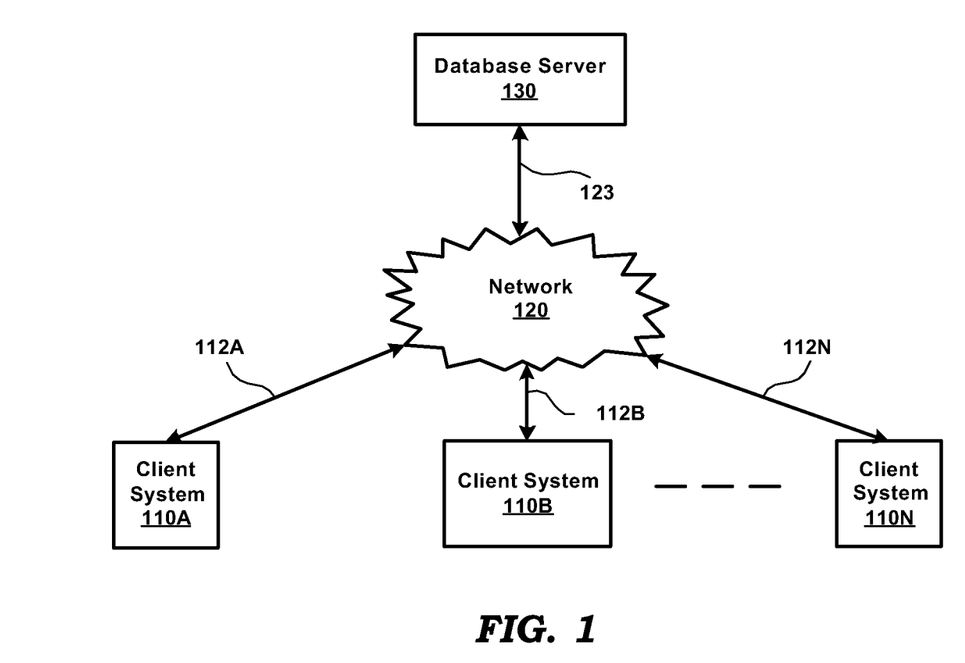
FIG. 1 is a block diagram illustrating the details of an example environment in which various aspects of the present invention can be implemented.

FIG. 1 is a block diagram illustrating an example environment in which various aspects of the present invention can be implemented. The environment is shown containing database server 130, network 120, and client systems 100A through 100N. Each system/device is described below in further detail.

Network 120 provides the connectivity to facilitate forwarding of queries (e.g., in the form of SQL) from client systems to database server 130 on path 123, and the responses from database server 130 back to client systems on the corresponding paths. Network 120 may be implemented using protocols such as Internet Protocol.

Client systems 110-A through 110-N send queries to and receive the corresponding responses from network 120, on paths 112A through 112N respectively. Client systems 110-A through 110-N may have several applications executing (such as automated teller applications, ticket reservation and enquiry applications, etc), which cause SQL queries to be sent to database server 130 on network 120.

Database server 130 processes the queries received from client systems 110-A through 110-N, and sends the corresponding responses on path 123. In general, the queries first specify database schemas to be defined for each table contained in a database instance, and then various operations for the management of data in the framework of the tables.

As noted above in the background section, there may be several situations in which the historical values of fields of interest need to be tracked. Various aspects of the present invention track such historical values, as described below in further detail.

3. Tracking Historical Values of Fields

Figure 2:
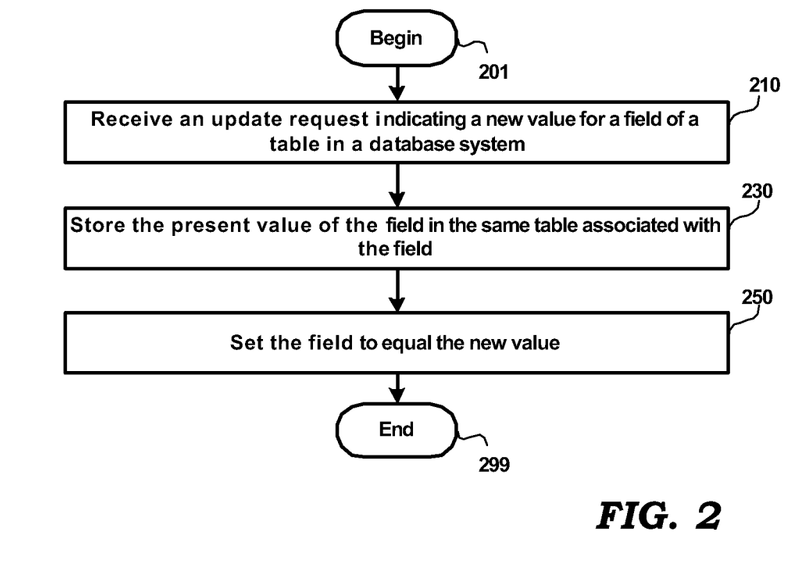
FIG. 2 is a flow chart illustrating the manner in which a database server ensures that a desired update request is processed according to various aspects of the present invention.

FIG. 2 is a flowchart illustrating the manner in which a database server tracks the historical values of fields of interest according to various aspects of the present invention. The flowchart is described with respect to FIG. 1 merely for illustration. However, various features can be implemented in other environments without departing from several aspects of the present invention, as will be apparent to one skilled in the relevant arts by reading the disclosure provided herein. The flow chart begins in step 201, in which control immediately passes to step 220.

In step 220, database server 130 receives an update request indicating a new value for a field of a table. The update request can be in the form of an SQL query or according to any convention.

In step 230, database server 130 stores the present (i.e., at the time of reception of the update request) value in the same table associated with the field. In general, the (management software of) database server needs to be designed to permit storing of multiple values associated with the field. Various approaches will be apparent to one skilled in the relevant arts based on the disclosure provided herein. Such approaches are contemplated to be covered by various aspects of the present invention. An example approach is described in sections below in further detail.

In step 250, database server 130 sets the field to equal the new value (as required to process the update request) received in step 220. The flowchart then ends in step 299. Due to the storing of the present value in step 230, historical values for the field are maintained.

The description is continued with respect to the manner in which database server 130 may store the historical values for a field in one embodiment.

4. Storing Historical Values

According to one approach, pre-existing database servers supporting SQL queries and VARRAY structures (for columns of interest) are modified to support the storing of historical values for fields of interest. In such an approach, client systems 110A-110N can send queries as if no historical data is maintained, and database server 130 automatically translates the queries into a form consistent with the storage in the VARRAY structures.

For simplicity, the implementation concepts are described in a scenario in which historical data related to all fields of a table are maintained, and also a change of some columns is reflected as a change to the same corresponding values in other columns. However, conventions can be employed to specify only the fields of interest and VARRAYs can be specified only for such specified fields.

Broadly, a VARRAY structure is created for each field for which historical information needs to be maintained. The depth of the structure can be set to the number of historical data elements sought to be maintained for the corresponding field. For further description of VARRAY structures, the reader is referred to a document entitled, "Oracle9i: JDBC Developer's Guide and Reference: Release 2 (9.2)", Part No: A96654_01, dated March 2002.

Figure 3A:
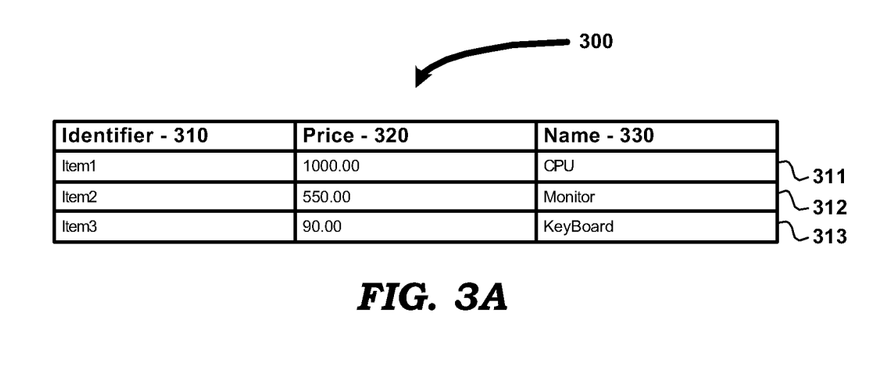
FIG. 3A contains data contained in a table of a Relational Database (RDB) as viewed by the user.

Thus, FIG. 3A represents a view of the data stored in database server 130, ignoring the storing of the historical data. Thus, view 300 is shown containing columns identifier 310, price 320 and name 330, storing data in three rows 311, 312 and 313.

Figure 3B:
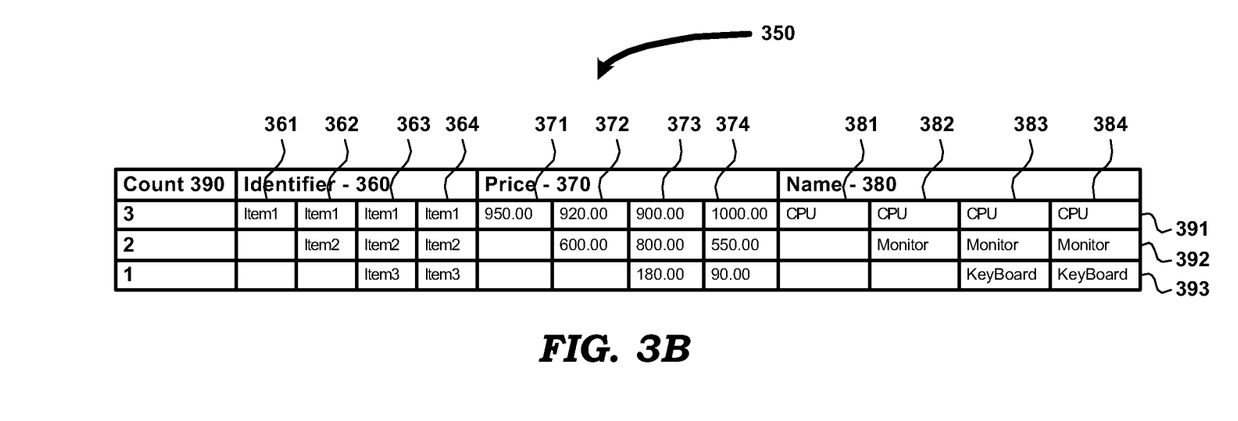
FIG. 3B contains data in a table accessed by the database management application executed on a database server implementing various aspects of the present invention.

FIG. 3B represents the actual data stored in tables by database server 130 permitting storing of historical values. For simplicity, it is assumed that only (up to) 3 prior values need to be stored. Thus, table 350 is shown containing three rows 391-393 organized using columns identifier 360, price 370, name 380 and count 390. Each column is described below in further detail. Columns 360, 370, and 380 are shown containing respective sub-columns 361-364, 371-374, and 381-384, are described in sections below.

Column 390 contains a value representing the number of prior values presently available for the corresponding row under the assumption that a change of value to even one field would be reflected as a change (to the same prior value) in the remaining columns (as illustrated with respect to row 392, where only value of price is sought to be changed but the prior value of the remaining columns are also copied.

Each column 360, 370 and 380 is shown containing multiple sub-columns (only 4 assuming 3 prior values need to be stored indicated by 361-364, 371-374, 381-384) representing the entries of the corresponding VARRAY, but respectively correspond to identifier, price and name, also shown in FIG. 3A. According to one convention, the left most entry (361, 371, 381) has an index equal to 1+number of prior values presently available (as indicated by the value of column 390) and contains the earliest value for the column and the right most entry (364, 374, 384) has an index value of 1 and contains the present value.

Figure 4A:
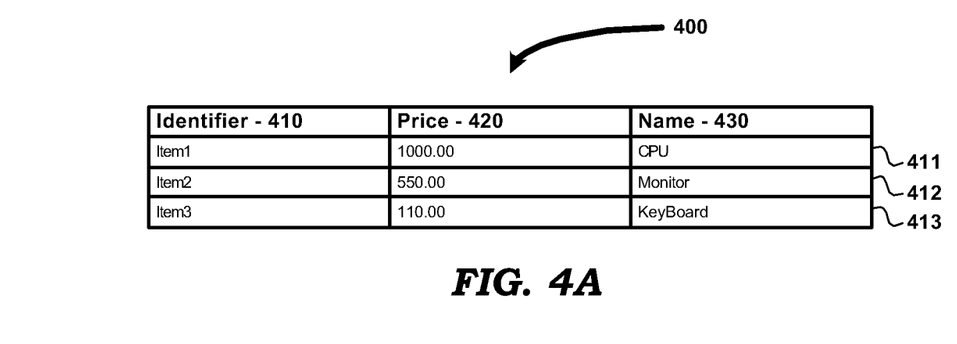
FIG. 4A contains data in a table of a Relation Database as viewed by the user, after the database server has processed an update request from the user.
Figure 4B:
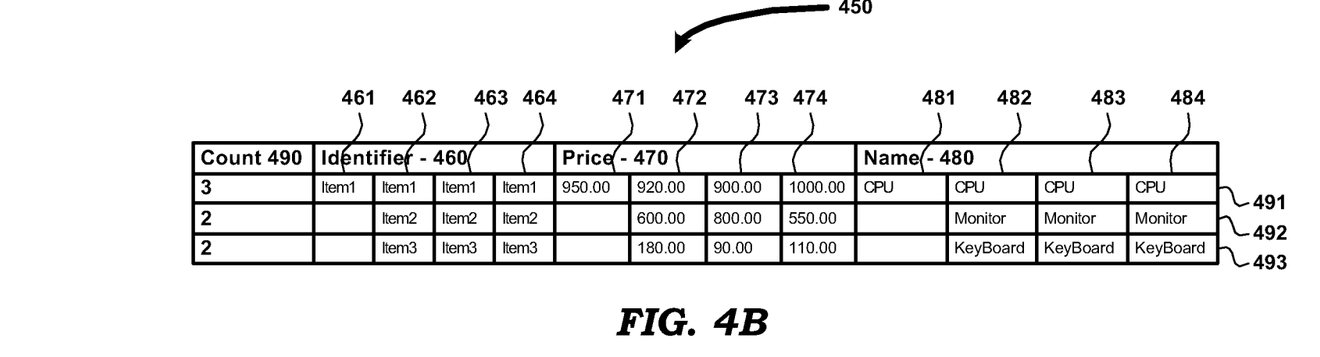
FIG. 4B contains data in the table accessed by the database management application executed on a database server after processing of a update request.

Now assuming that a query is received to change the price of row 393 to 110.00 the changes to view 300 and table 350 are respectively shown in view 400 and table 450 of FIGS. 4A and 4B respectively.

It may thus be appreciated that the user queries may continue to be on the view of FIGS. 3A and 4A, while database server 130 contains the internal logic to store the tables of FIGS. 3B and 4B and to process the user queries appropriately. The manner in which database server 130 can be implemented is described below in further detail.

5. Database Server

Figure 5:
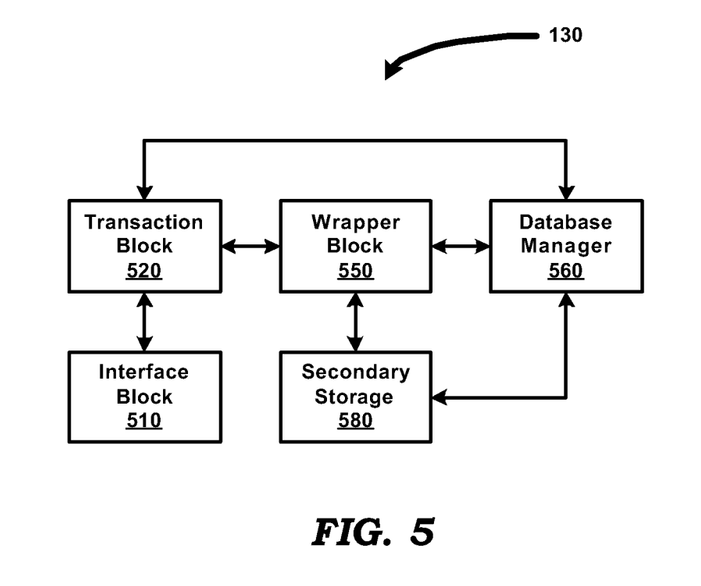
FIG. 5 is a block diagram illustrating the details of a database server in one embodiment.

FIG. 5 is a block diagram illustrating the details of database server 130 in one embodiment. Database server 130 is shown containing interface block 510, transaction block 520, wrapper 550, database manager 560, and secondary storage 580. Each block is described below in further detail.

For illustration of some features, it is assumed that database server 130 receives multiple queries forming a single 'atomic' transaction (i.e., requiring reversal of any completed queries if any of the later queries are not executed successfully to completion). In case such reversal is required, the historical values are conveniently used to revert back to the values prior to receiving the transaction, as described below in further detail.

Secondary storage 580 stores the data underlying the database instances containing the tables of FIGS. 3B/4B. Database manager 560 receives queries directed to the tables of FIGS. 4B/3B in the form of SQL (structured query language), and manipulates the data in secondary storage 580 to support the database instances. As can be appreciated, the queries would be directed to VARRAYS (in the example scenario being described).

Interface block 510 provides the physical, electrical and protocol interfaces to receive queries (either as a part of transactions, or as individual queries) and passes the received queries to transaction block 520. Similarly, interface block 510 sends back any responses generated by transaction block 520.

Transaction block 520 forwards queries received from user systems 110A-110N to wrapper block 550 in case the queries are directed to the view of FIGS. 3A/4A. On the other hand, if the queries are directed to the tables of FIGS. 3B/4B, transaction block 520 forwards the queries directly to database manager 560. Irrespective, the responses to queries sent on both paths, may be received directly from database manager 560.

Transaction block 520 may further issue queries itself to the extent needed for reversing prior changes to maintain atomicity of transactions. In such a situation, the count of column 390/490 may need to be decremented by 1.

Wrapper block 550 performs the necessary translations between the queries directed to the view of FIGS. 3A/4A to generate the queries suitable for tables 3B/4B. The nature of the queries to be generated will be clearer from the examples described below.

6. Examples

Broadly, queries are first received to define the schema, then to insert rows, and then to update the previously stored values. Accordingly, the description is continued with respect to corresponding three queries.

Figure 6A:
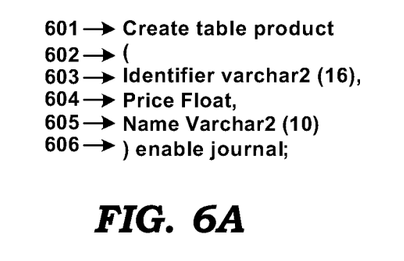
FIG. 6A is a query from a user system containing a schema definition to create a table in a relational database used in an embodiment of the present invention.
Figure 6B:
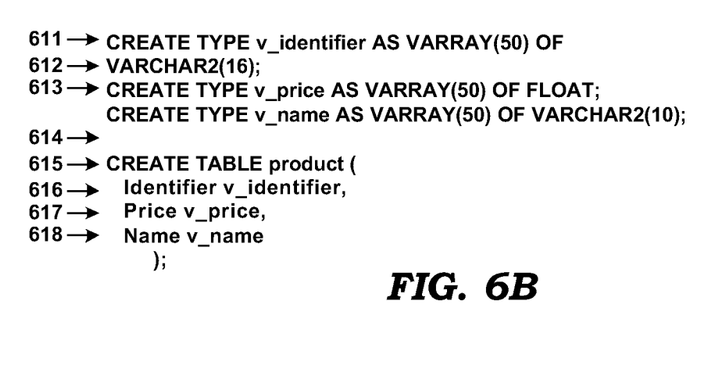
FIG. 6B is a query generated by the wrapper program to create a table implementing various aspects of the present invention.

To define the schema corresponding to FIGS. 3A/3B, user system 110A may send the SQL query shown in lines 601-607 of FIG. 6A. Given that VARRAYS are to be maintained for all the columns, wrapper block 550 may generate the SQL query of lines 611-619 of FIG. 6B. Information indicating mapping of column labels Identifier 310, Price 320 and Name 330 to column labels Identifier 360, Price 370 and Name 380 respectively, is stored in secondary storage 580 according to any pre-specified convention.

Figure 7A:
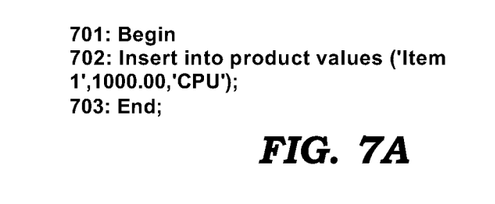
FIG. 7A is a query from a user system to insert a row into a table in the relational database
Figure 7B:
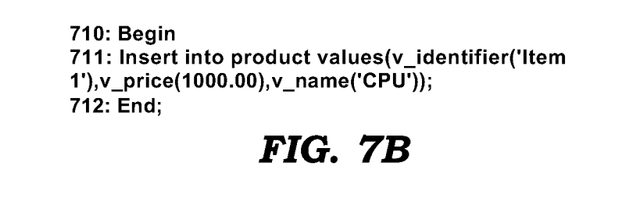
FIG. 7B is a query generated by the wrapper program to insert a row into the table defined in a database server implementing various aspects of the present invention.

To insert a row with values corresponding to row 311, the query of lines 701-703 of FIG. 7A are received from one of user systems 110A-110N. Wrapper program 550 may generate the SQL query of lines 710-712 of FIG. 7B, and pass the query to database manager 560. In response to the query, the values "item 1", 1000 and "CPU" would be written in sub-columns 364, 374 and 384, which are modified again (resulting in the final values shown in FIG. 3B), as described below.

As noted above, sub-column 364 indicates a present value for identifier 360, sub-column 374 the present value for column price 370 and sub-column 384 indicates the present value for name 380.

During processing of an update request for any of the columns (of FIG. 3B) identifier 360, Price 370 and Name 380, new values for each of the columns are respectively stored in sub-columns 364, 374 and 384. In addition, values of sub-columns (364, 374, 384) are copied into corresponding sub-columns (363, 373, 383), values of sub-columns (363, 373, 383) into corresponding sub-columns (362, 372, 382) and values of sub-columns (363, 373, 383) into (362, 372, 382) and (362, 372, 382) into sub-columns (361, 371, 381), thus enables tracking of modifications to any of the columns in a row in the same table.

Figure 8A:
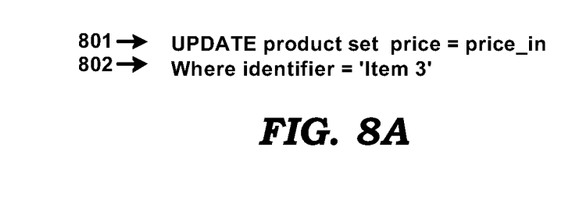
FIG. 8 is a query from a user system to update a field in the table defined according to various aspects of the present invention.
Figure 8B:
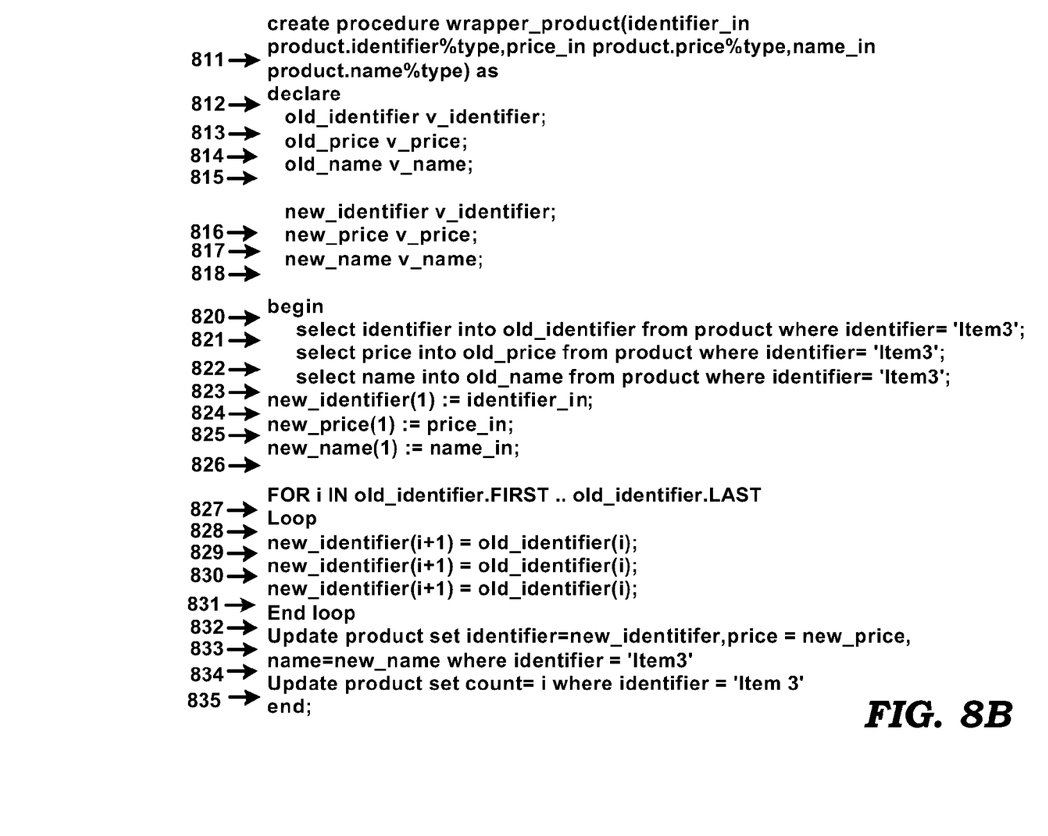

Continuing with the illustration of tracking of changes, to update the value of price 320 (in row 393) with a new value or any prior value, the query of lines 801-802 of FIG. 8A are received from user systems 110A-110N. Wrapper program 550 may generate the SQL query of lines 811-835 of FIG. 8B.

As may be appreciated, the query of lines 824-826 set the value of the first element (corresponding to sub-columns 364, 374 and 384) to contain the new value. Also, query lines within the loop indicated by lines 828-832 set the value for each sub-column (i) representing a prior value (361-363, 371-373, 381-383) to the value in another sub-column i+1 as indicated in FIG. 4B.

Accordingly, row 493 is shown containing new values for the sub-columns. Row 493 contains a new value 110.00 in column 474 and prior values (as indicated by sub-columns 374, 373) stored in sub-columns 473 and 472 respectively after the processing of the update request is complete. Also, row 493 indicates that sub-columns 462-464 and 482-484 also contain values such that a new value in stored in sub-columns 464 and 484. Values in sub-columns 363 and 364 are shown respectively stored in sub-columns 462 and 463 and Values in sub-columns 383 and 384 are respectively stored in sub-columns 482 and 483. Additionally, it may be appreciated tat column 490 is shown updated to a value '2' to indicate the count of prior values for the row (as in query line 834).

It should be appreciated that the wrapper approach illustrates an example technique to store historical values of (desired) fields. However, alternative approaches (such as making changes to database manager software itself) can be implemented without departing from the scope and spirit of several aspects of the present invention.

It should be appreciated that database server 130 may be implemented in a combination of one or more of hardware, software and firmware. The description is continued with respect to an embodiment which various features are operative by execution of corresponding software instructions.

7. Digital Processing System

Figure 9:
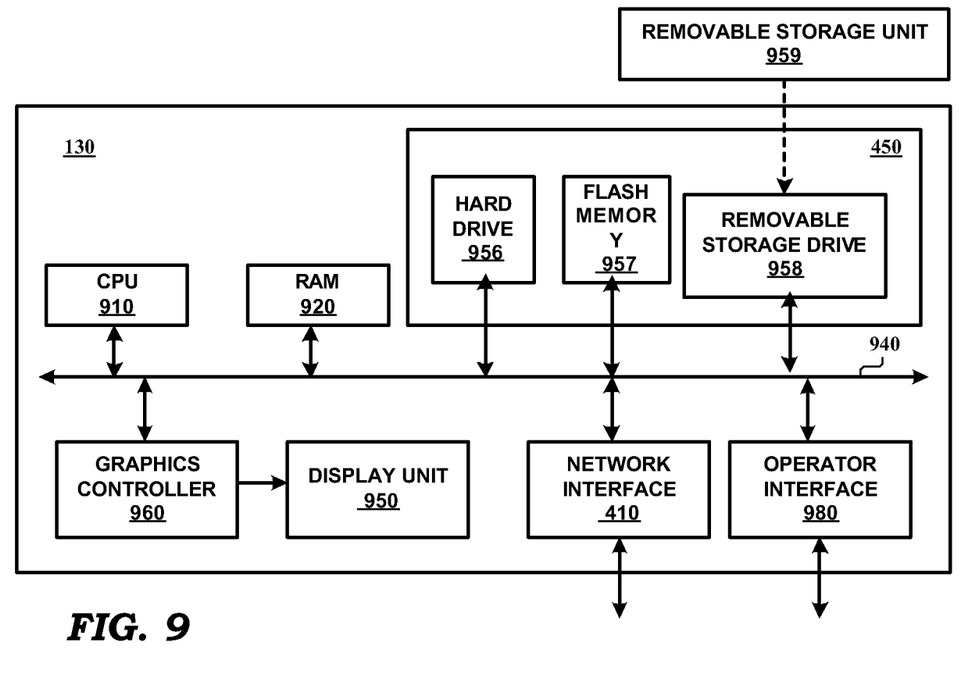
FIG. 9 is a block diagram illustrating the details of a database server in another embodiment.

FIG. 9 is a block diagram illustrating the details of database server 130 in another embodiment. Server 130 may contain one or more processors such as central processing unit (CPU) 910, random access memory (RAM) 920, secondary storage unit 580, graphics controller 960, display unit 950, network interface 410, and operator interface 470. All the components except display unit 950 may communicate with each other over communication path 940, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary storage unit 580 using communication path 940. RAM 920 provides the memory space required for processing of various queries.

Graphics controller 960 generates display signals (e.g., in RGB format) to display unit 950 based on data/instructions received from CPU 910. Display unit 950 contains a display screen to display the images defined by the display signals. Network interface 410 provides connectivity to a network (e.g., using Internet Protocol), and may be used to receive various transaction requests and provide the corresponding responses.

Secondary storage unit 580 may contain hard drive 956, flash memory 957, and removable storage drive 958. Secondary storage unit 580 stores mapping of columns in user view of each of the table to columns in DBMS view of the corresponding table and may also store other data and software instructions, which enable database server 130 to provide several features in accordance with the present invention. Some or all of the data and instructions may be provided on removable storage unit 959, and the data and instructions may be read and provided by removable storage drive 958 to CPU 910. Floppy drive, magnetic tape drive, CD_ROM drive, DVD Drive, Flash memory, removable memory chip (PCM-CIA Card, EPROM) are examples of such removable storage drive 958.

Removable storage unit 959 may be implemented using medium and storage format compatible with removable storage drive 958 such that removable storage drive 958 can read the data and instructions. Thus, removable storage unit 959 includes a computer readable storage medium having stored therein computer software and/or data.

In this document, the term "computer program product" is used to generally refer to removable storage unit 959 or hard disk installed in hard drive 955. These computer program products are means for providing software to server 130. CPU 910 may retrieve the software instructions, and execute the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of tracking modifications to a field in a relational table of a database instance supported by a relational database server, said method comprising:

receiving a relational query specifying an update request indicating a new value for said field of said relational table, wherein a present value of said field equals a first value when said relational query is received;

in response to receiving said relational query specifying said update request:

storing said first value in said relational table as a historical value of said field; and storing said new value in said field in said relational table as said present value of said field, wherein said new value represents said present value of said field in said relational table after processing of said update request and said first value is also available as said historical value in said relational table after processing of said update request, and wherein storing of said first value and said new value in said relational table is enabled by storing two values in said field in said relational table, and wherein said field is enabled to store two values by:

receiving instruction indicating said field is of interest for tracking historical values; and in response to receiving said instruction, defining said field as type array causing said field to comprise two sub-columns each sub-column capable of storing a value, wherein each of the first value and the new value is stored in the respective sub-column of said field, wherein the two sub-columns of said field in the relational table are addressable by respective ones of different values of an index associated with the array, wherein each of the first value and the new value is stored in the corresponding sub-column by having the respective value for the index associated with the array.

2. The method of claim 1, wherein said relational query specifying said update request is received from a client system.

3. The method of claim 1, wherein said array is a VARRAY of at least depth 2.

4. The method of claim 3, wherein said storing said first value stores said first value in a second sub-column of said two sub-columns of said field, and said storing said new value stores said new value in a first sub-column of said two sub-columns of said field, wherein said first sub-column stores the present value for said field and said second sub-column stores said historical value for said field.

5. The method of claim 4, wherein said relational query specifying said update request is directed to a first view of said relational table, wherein said first view comprises said relational table comprising only said present value, said method further comprising:

generating a first set of queries and a second set of queries in response to receiving said relational query, wherein said storing said first value comprises executing said first set of queries on said relational database system to cause said first value to be stored in said second sub-column, and wherein said storing said new value comprises executing said second set of queries on said relational database server to cause said new value to be stored in said first sub-column.

6. The method of claim 4, wherein said field comprises a third sub-column, by setting said depth of said VARRAY to 3, to store in said third sub-column a value representing the number of previous historic values available in said relational table for said field, said method further comprising:

decrementing said value by 1 when reversing a previous change made to said present value of said field.

7. The method of claim 1, wherein said field is formed at the intersection of a row with a column in said relational table.

8. A computer readable storage medium storing one or more sequences of instructions causing a relational database server to track modifications to a field of a plurality of fields in a relational table in a database instance supported by said relational database server, wherein execution of said one or more sequences of instructions by one or more processors in said relational database server causes said relational database server to perform the actions of:

creating said field of said plurality of fields as an array such that said field is divided into a first sub-column and a second sub-column, wherein the two sub-columns of said field in the relational table are addressable by respective ones of different values of an index associated with the array, wherein said first sub-column stores a present value and said second sub-column is also capable of storing a value, thereby enabling said field to store two values, wherein said creating said field as an array is in response to receiving instructions indicating said field is of interest for tracking historical value for said field;

receiving a relational query specifying an update request indicating a new value for said field of said relational table, wherein a present value of said field equals a first value when said update request is received; and in response to receiving of said update request, storing said first value in said second sub-column of said field by addressing said second sub-column as said array with the associated value as said index; and storing said new value in said first sub-column of said field by addressing said first sub-column as said array with the associated value as said index, whereby said new value stored in said first sub-column of said field in said relational table represents said present value after processing of said update request and said first value is also available in said relational table as a historical value stored in said second sub-column of said field.

9. The computer readable storage medium of claim 8 further comprising:

generating a first set of queries and a second set of queries in response to receiving said relational query, wherein said storing said first value comprises executing said first set of queries on said relational database system to cause said first value to be stored in said second sub-column, and wherein said storing said new value comprises executing said second set of queries on said relational database server to cause said new value to be stored in said first sub-column.

10. The computer readable storage medium of claim 9, wherein said present value of said field of said table is represented by a first view and said present value with said historical value of said field of said table represents actual data stored in said table.

11. The computer readable storage medium of claim 10, wherein said relational query specifying said update request is directed to said first view of said relational table, and wherein said first set of queries and said second set of queries are directed to said actual data stored in said table.

12. The computer readable storage medium of claim 8, wherein said update request is received from a client system.

13. The computer readable storage medium of claim 8, wherein said array is a VARRAY of at least depth 2.

14. The computer readable storage medium of claim 13, wherein said field comprises a third sub-column, by setting said depth of said VARRAY to at least 3, wherein said third sub-column stores a value representing the number of previous values available in said table for said field and said value is decremented by 1 when reversing a previous change made to said present value of said field.

15. The computer readable storage medium of claim 8, wherein said instruction for said creating said field is comprised in a SQL create table query accompanied with said instruction indicating said field is of interest for tracking historical values.

16. The computer readable storage medium of claim 8, wherein said field is formed at the intersection of a row with a column in said relational table.

17. A system comprising:

a relational database server capable of tracking modifications to a value of a field of a relational table in a database instance supported by said relational database server, said system capable of:

receiving a relational query specifying an update request indicating a new value for said field of said relational table, wherein a present value of said field equals a first value when said relational query is received;

in response to receiving said relational query specifying said update request, storing said first value in said relational table as a historical value of said field; and storing said new value in said field in said relational table as said present value of said field, wherein said new value represents said present value of said field in said relational table after processing of said update request and said first value is also available as said historical value in said relational table after processing of said update request, and wherein storing of said first value and said new value in said relational table is enabled by storing two values in said field in said relational table, and wherein said field is enabled to store two values by:

receiving instruction indicating said field is of interest for tracking historical values; and in response to receiving said instruction, defining said field as type array causing said field to comprise two sub-columns each sub-column capable of storing a value, wherein each of the first value and the new value is stored in the respective sub-column of said field, wherein the two sub-columns of said field in the relational table are addressable by respective ones of different values of an index associated with the array, wherein each of the first value and the new value is stored in the corresponding sub-column by having the respective value for the index associated with the array.

18. The system of claim 17, wherein said array is a VARRAY of at least depth 2.

19. The system of claim 18, wherein said storing said first value stores said first value in a second sub-column of said two sub-columns of said field, and said storing said new value stores said new value in a first sub-column of said two sub-columns of said field, wherein said first sub-column stores the present value for said field and said second sub-column stores said historical value for said field.

20. The system of claim 17, wherein said field is formed at the intersection of a row with a column in said relational table.

21. A method of tracking modifications to a field in a relational table of a database instance supported by a relational database server, said method comprising:

receiving a relational query specifying an update request indicating a new value for said field of said relational table, wherein a present value of said field equals a first value when said relational query is received;

in response to receiving said relational query specifying said update request:

storing said first value in said relational table as a historical value of said field; and storing said new value in said field in said relational table as said present value of said field, wherein said new value represents said present value of said field in said relational table after processing of said update request and said first value is also available as said historical value in said relational table after processing of said update request, and wherein storing of said first value and said new value in said relational table is enabled by storing two values in said field in said relational table, and wherein said field is enabled to store two values by:

receiving instruction indicating said field is of interest for tracking historical values; and in response to receiving said instruction, defining said field as type array causing said field to comprise two sub-columns each sub-column capable of storing a value, wherein said each of said first value and said second value is stored in the respective sub-column of said field, wherein the two sub-columns of said field in the relational table are addressable by respective ones of different values of an index associated with the array, wherein each of the two values is stored in the corresponding sub-column by having the respective value for the index associated with the array.

\* \* \* \* \*

UNITED STATES PATENT AND TRADEMARK OFFICE
CERTIFICATE OF CORRECTION

| | |
|---|---|
| PATENT NO. | : 8,626,746 B2 |
| APPLICATION NO. | : 13/526560 |
| DATED | : January 7, 2014 |
| INVENTOR(S) | : Krishnamoorthy |

It is certified that error appears in the above-identified patent and that said Letters Patent is hereby corrected as shown below:

On title page and in the specification, column 1, line 2, under title, delete "SERVE" and insert -- SERVER --, therefor.

On title page, column 1, after "Continuation of application No. 11/164,923, filed on Dec. 12, 2005, now Pat. No. 8,224,808" insert
-- Foreign Application Priority Data
Oct. 10, 2005 (IN)............... 1570/CHE/2005 -- as a new section.

In the Specification

In column 1, line 67, delete "database" and insert -- database. --, therefor.

In column 2, line 38, delete "well_known" and insert -- well known --, therefor.

Signed and Sealed this
Seventh Day of July, 2015

Michelle K. Lee
*Director of the United States Patent and Trademark Office*